R. L. OLIVER.
POTATO DIGGING AND CLEANING APPARATUS.
APPLICATION FILED MAY 16, 1919.
1,367,424.
Patented Feb. 1, 1921.
4 SHEETS—SHEET 1.
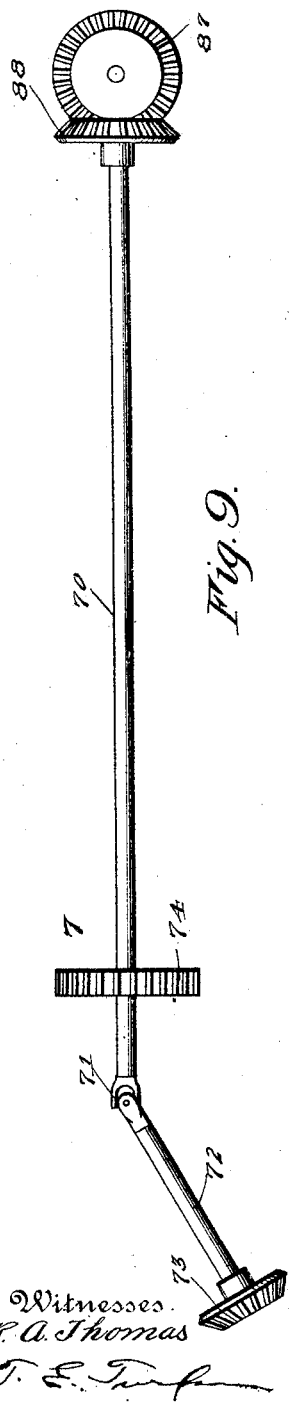
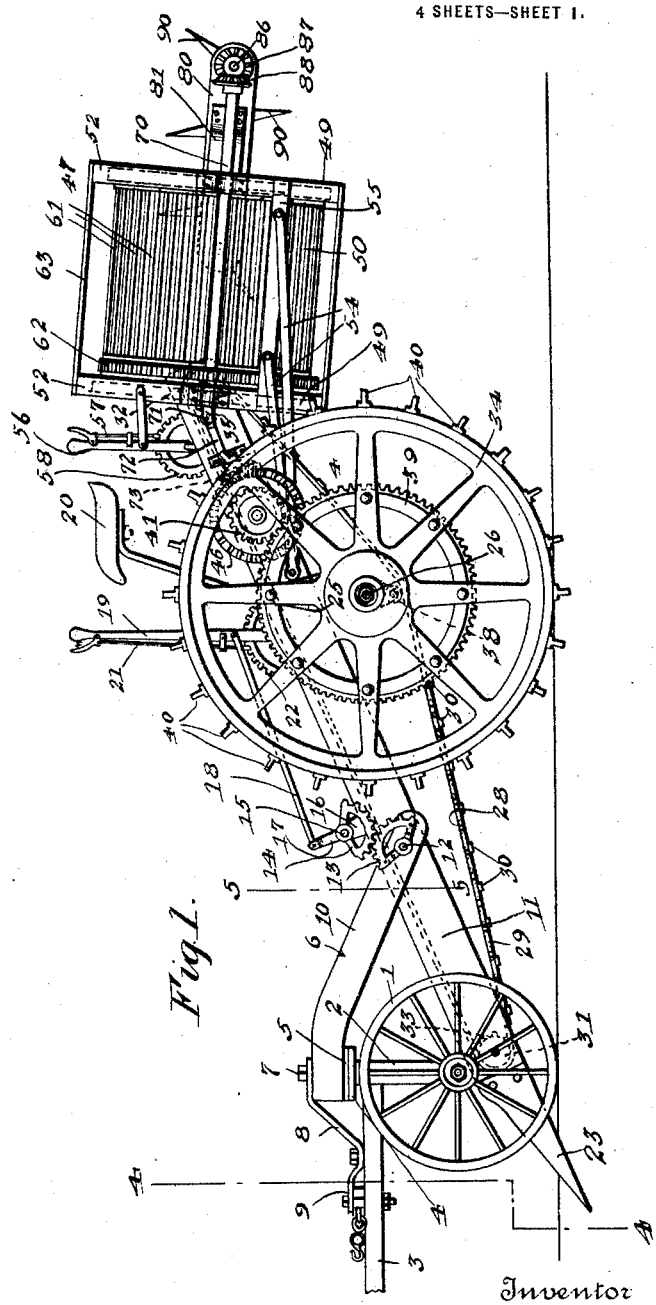
Inventor
R. L. Oliver
By Victor J. Evans
Attorney
Witnesses

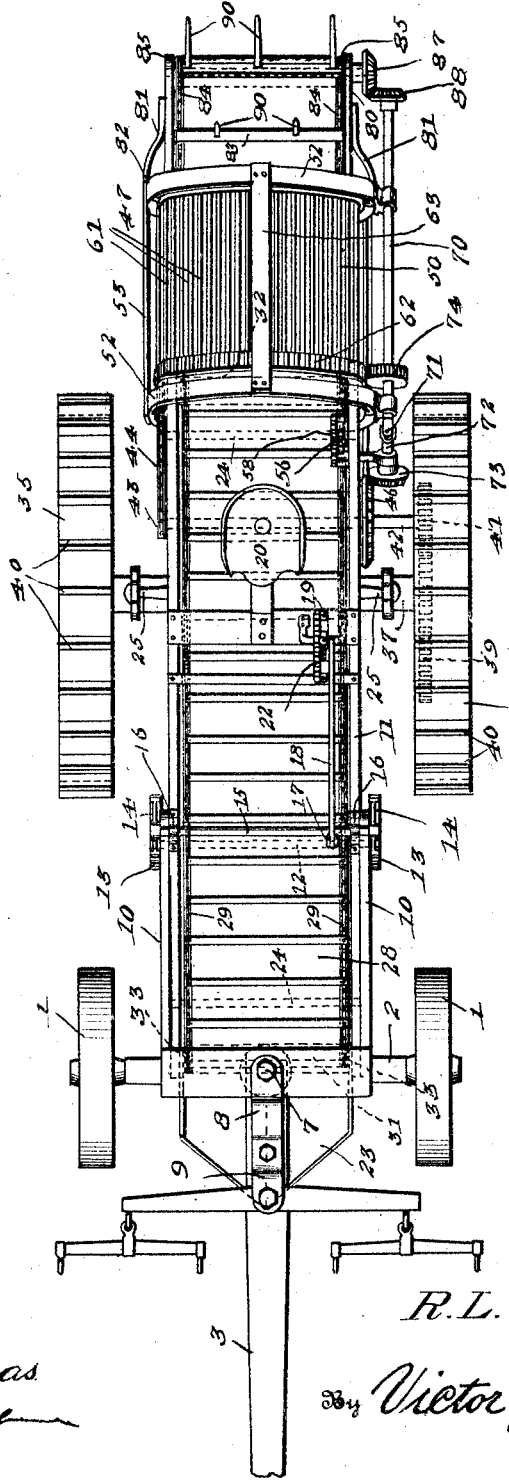

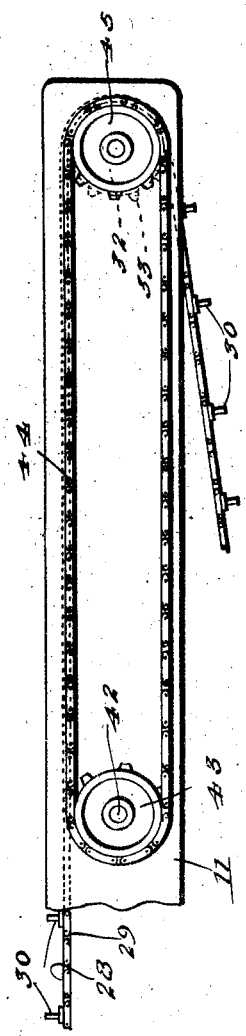
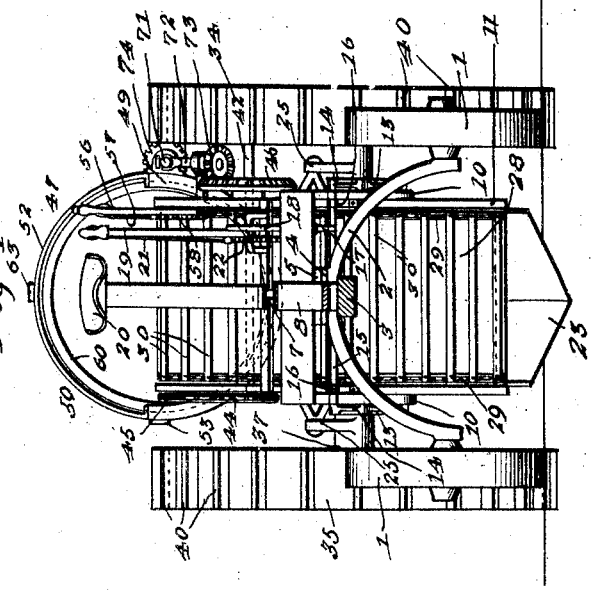
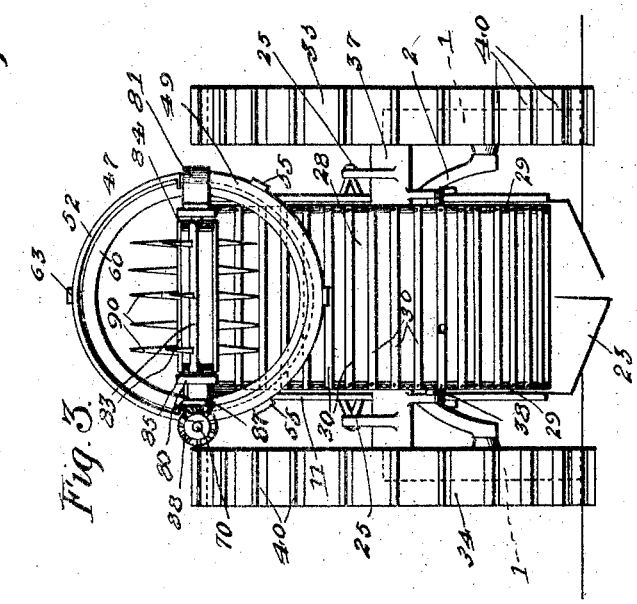

R. L. OLIVER.
POTATO DIGGING AND CLEANING APPARATUS.
APPLICATION FILED MAY 16, 1919.
1,367,424.
Patented Feb. 1, 1921.
4 SHEETS—SHEET 4.
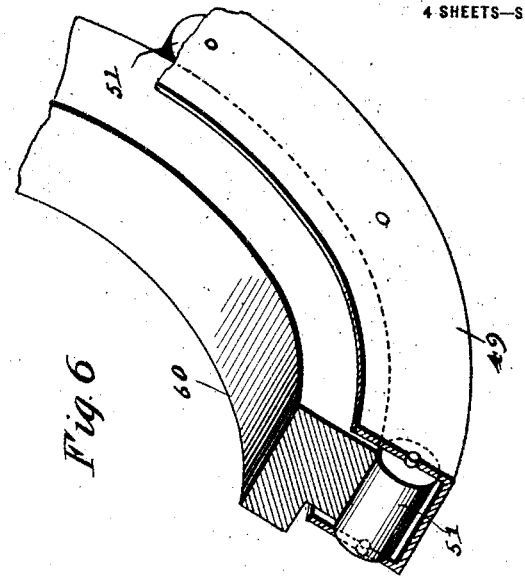
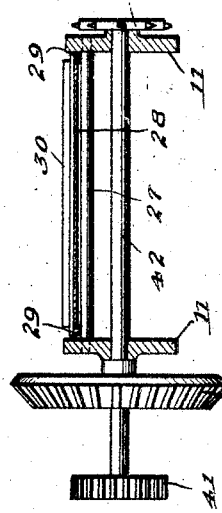
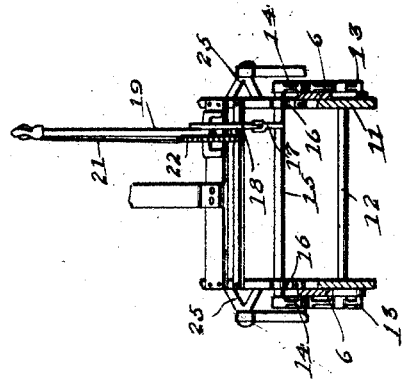
Witnesses
R. A. Thomas
Inventor
R. L. Oliver
By Victor J. Evans
Attorney

UNITED STATES PATENT OFFICE.

ROBERT L. OLIVER, OF DORRIS, CALIFORNIA.

POTATO DIGGING AND CLEANING APPARATUS.

1,367,424. Specification of Letters Patent. Patented Feb. 1, 1921.

Application filed May 16, 1919. Serial No. 297,483.

*To all whom it may concern:*

Be it known that I, ROBERT L. OLIVER, a citizen of the United States, residing at Dorris, in the county of Siskiyou and State of California, have invented new and useful Improvements in Potato Digging and Cleaning Apparatus, of which the following is a specification.

The general object of my invention is the provision of a wheeled potato digging and cleaning apparatus in which the separation of earth from the potatoes is effectively accomplished through the medium of a rotary cleaning drum and in which the vines are separated in an adequate manner from the potatoes and are disposed of without liability of choking the apparatus; all of the working parts being driven from a ground wheel, and the apparatus as a whole being capable of ready adjustment as occasion requires.

The invention in all of its details will be fully understood from the following description and claims when the same are read in connection with the accompanying drawings, hereby made a part hereof, in which:

Figure 1 is a side elevation of the apparatus constituting the best practical embodiment of my invention that I have as yet devised.

Fig. 2 is a complete top plan view of the same.

Fig. 3 is a rear end elevation of the apparatus.

Fig. 4 is a transverse vertical section taken in the plane indicated by the line 4—4 of Fig. 1, looking rearwardly.

Fig. 5 is a detail transverse section on line 5—5 of Fig. 1 showing an adjusting provision hereinafter explicitly referred to.

Fig. 6 is an enlarged fragmentary sectional perspective illustrative of the antifriction mounting of the cleaning drum.

Figs. 7, 8 and 9 are detail views of driving connections hereinafter referred to.

Similar numerals of reference designate corresponding parts in all of the views of the drawings.

The front wheels 1 of the apparatus are carried at the ends of an arch axle 2, Fig. 4, and to the intermediate portion of the said axle is suitably connected a pole 3; the apparatus being preferably, though not necessarily, movable through the medium of draft animals. Fixed with respect to the axle 2 is a fifth wheel member 4 upon which is superimposed a complementary fifth wheel member 5, fixed with respect to a tilting frame 6, the frame 6 of the fifth wheel member 5 being strongly and pivotally connected with the fifth wheel member 4 through the medium of a king bolt 7. When deemed expedient the tongue or pole 3 is braced by a metallic strap 8 that extends from the king bolt 7 to the double-tree strap 9 complementary to the pole 3. The tilting frame is preferably of steel, and the side members 10 are connected with the elevator frame 11 of the apparatus through the medium of a transverse shaft 12 mounted in suitable bearings. Fixed with respect to the side members 10 of the tilting frame are gear sectors 13 which are mounted on the said shaft 12. These gear sectors 13 are intermeshed with upper gear sectors 14 which are fixed upon a transverse shaft 15 journaled in suitable brackets 16 on the elevator or draper frame 11. The shaft 15 is also equipped with a crank 17, connected through a rearwardly extending pitman 18 with a hand lever 19, mounted upon the frame 11 within convenient reach of the driver's seat 20 and provided with a detent 21 for coöperation with a segmental rack 22 fixed upon the elevator or draper frame. Manifestly by actuating the lever 19, the machine may be conveniently tilted and may then be adjustably fixed in the state desired. The elevator or draper frame 11 which is comprised in the main frame of the apparatus is preferably of steel, and is provided at its forward and lower end with a convex steel shovel 23, best shown in Fig. 4. Said frame 11 preferably has a plurality of spreader rods 24, Fig. 2, and it is attached through the medium of brackets 25, Fig. 3, to the axle 26, hereinafter specifically referred to. As indicated by 27, Fig. 7, lower and upper transverse rollers are provided in the frame 11 to assure easy movement of the draper. The said draper comprises an endless belt 28 of rubber belting or other suitable material, sprocket belts 29 attached to the said belt 28 at the edges thereof, and metallic slats 30 extending between and connected to links of the opposite sprocket belts. Also carried by the frame 11 are lower and upper rollers 31 and 32 on which are sprocket gears 33 in engagement with the sprocket belt 29, with a view to maintaining the draper in correct alinement. The ground and drive wheels 34 and 35 are loose on the axle or axle shaft 26 and are preferably equipped in the usual manner to cause the wheels to turn in unison with the shaft when the machine is making a straight drive and to permit one of the wheels to rotate faster than the other at a turn. The axle shaft 26 is mounted to turn in a housing 37 fixed with respect to the frame 11, and in the preferred embodiment of the invention the said housing 37 is equipped at its under side with an anti-friction roller 38, preferably of steel, the function of which is to prevent undue wear of the draper the lower stretch of which bears against the said roller 38. Suitably fixed with respect to the left-hand wheel 34 is a driving gear 39. It will also be noticed here that each of the wheels 34 and 35 is provided with peripheral grouters 40, designed to increase the tractive capacity thereof. The drive gear 39 is intermeshed with a comparatively small spur gear 41 which is fixed upon a transverse shaft 42 arranged transversely in suitable bearings in the draper frame 11. At the right hand side of the draper frame 11 the said shaft 42 is provided with a sprocket gear 43, Fig. 8, and the sprocket gear 43 is connected through a sprocket belt 44 with a sprocket gear 45 fixed with respect to the upper roller 32 for the driving of the draper. By particular reference to Fig. 7 it will be understood that the shaft 42 is provided at a point adjacent to the spur gear 41 with a beveled gear 46 for the driving of the cleaning drum 47 and the vine conveyer 84, as hereinafter described in detail.

Arranged in spaced and parallel relation adjacent to the rear end of the apparatus and in an elevated position are the end members 49 of the frame complementary to the revoluble cleaning drum 47. Each of the said end members 49 describes more than half a circle, and each is of channel form in cross-section Fig. 6, and is provided in its channel and at intervals of its length with anti-friction rollers 51. The said members 49 are each provided with a substantially semi-circular crown-piece 52 which is connected at its ends to its respective end member. It will also be observed that the two end members are connected together and fixed with respect to each other through the medium of diametrically opposite and longitudinally disposed bars 53, best shown in Figs. 1 and 3. The drum frame formed as stated is hung on the ends of the draper drive shaft and is attached to the draper frame 11 through the medium of bars 54, two at each side of the apparatus; the said bars being adapted to swing on brackets 55 fixed at opposite sides of the drum frame. The drum frame is suitably connected as shown with a hand lever 56 mounted upon the draper frame 11 and equipped with a detent 57, designed to coöperate with a segmental rack 58 fixed on the draper frame 11, whereby the drum frame and the cleaning drum therein may be adjusted and adjustably fixed as required.

The cleaning drum 47 is revoluble in the frame just described, and is made up of circular hoops 60 having reduced portions, Fig. 6, disposed in the member 49 and against the anti-friction rollers 51 therein, and spaced longitudinal rods 61, interposed between and fixed to the said hoops 60. The ends of the drum 47 are open, and at about the distance illustrated from its forward end the drum is provided with a spur gear annulus 62.

Interposed between and fixedly connected to the crown members 52 of the drum frame is a longitudinal bar 63 which serves to contribute materially to the strength and rigidity of the frame, and this without interfering with the free rotation of the drum about and clear of which it is disposed.

Attached to one of the side bars 53 is a journal bearing for a longitudinally disposed drive shaft 70. This shaft 70 is connected through a universal joint 71, Fig. 9, with a shaft 72 on which is a beveled gear 73 intermeshed with the beveled gear 46 before described. Carried on the shaft 70 is a spur gear 74 that is intermeshed with the spur gear annulus 62 of the cleaning drum, and consequently it will be readily understood that when the machine is in operation, the drum 47 will be rotated about its axis upon the rollers 51, and incidental to such rotation will be effectively held against undue longitudinal or endwise movement.

At 80 is the frame of the vine conveyer that extends longitudinally into and rearwardly from the drum 47. This frame 80 is connected with the drum frame through the medium of brackets 81, which brackets are bolted at 82 to the drum frame. The vine conveyer is of endless type, and is composed of slats 83 in combination with sprocket belts 84, the latter being mounted upon sprocket gears 85 carried on transverse shafts 86 in the frame 80, and one of the shafts 86 being provided with a beveled gear 87 that is intermeshed with a beveled gear 88 on the before described shaft 70. In the said endless conveyers are comprised teeth 90 of considerable length which have for their function to pull the vines from the apparatus and in that way dispose of the vines in such manner that there is little liability of the apparatus becoming choked incidental to the operation thereof.

It will be manifest from the foregoing that incidental to the forward progress of the apparatus, the potatoes will be taken from the ground and carried with the vines upwardly and rearwardly, and that the potatoes will be cleared of dirt in and will be discharged from the drum 47, while the vines will be disposed of through the medium of the vine conveyer.

Having described my invention, what I claim and desire to secure by Letters-Patent, is:

1. In an apparatus for the purpose described, the combination with a frame having spaced members fixedly connected together, said members describing more than half of a circle and being of channel form in cross-section with parallel side walls and containing spaced anti-friction rollers spaced from the edges of said side walls, of a revoluble cleaning drum comprising two hoops extending between the side walls of said frame members and movable in the direction of their lengths against the anti-friction rollers thereof and held against movement longitudinally of the apparatus by said frame members, and spaced rods interposed between and connected to said hoops.

2. In an apparatus for the purpose described, the combination with a frame, of a revoluble open-work cleaning drum mounted in said frame and open at its ends, a spur gear annulus fixed with respect to the drum, a shaft carried by the frame and having a spur gear intermeshed with said annulus, a beveled gear on said shaft, a conveyer frame mounted within and projecting rearwardly from the drum, a vine conveyer carried by said frame and having a beveled gear intermeshed with that of the shaft, and means for rotating said shaft.

3. In an apparatus for the purpose described, the combination of a wheeled draper frame, a draper carried in said frame, a shaft driven from one of the wheels, a frame connected with the draper frame and arranged to be swung vertically and longitudinally, means for adjustably fixing the second-named frame with respect to the first-named frame, a revoluble drum of open-work construction open at its ends, mounted to revolve about its axis in the second-named frame and having a spur gear annulus, a conveyer frame mounted within and projecting rearwardly from the drum, a vine conveyer carried by said frame and having a beveled gear, a shaft carried by the second-named frame and connected with the first-named shaft, a spur gear carried by the second-named shaft and intermeshed with said spur gear annulus, and a beveled gear carried by the second-named shaft and intermeshed with that of the vine conveyer.

4. In an apparatus for the purpose described, the combination of a wheeled draper frame, a draper carried in said frame, a shaft driven from one of the wheels, a frame connected with the draper frame and arranged to be swung vertically and longitudinally, means for adjustably fixing the second-named frame with respect to the first-named frame, a revoluble drum of openwork construction open at its ends, mounted to revolve about its axis in the second-named frame and having a spur gear annulus, a shaft carried by the second-named frame and connected with the first-named shaft, a spur gear on the second-named shaft and intermeshed with said annulus, a conveyer frame carried by the second-named frame, a conveyer in said conveyer frame and having a beveled gear, and a beveled gear on the last named shaft and intermeshed with the beveled gear of the conveyer.

In testimony whereof I affix my signature.

ROBERT L. OLIVER.